(12) United States Patent
Mader et al.

(10) Patent No.: US 10,482,801 B2
(45) Date of Patent: Nov. 19, 2019

(54) START AND STOP METHODS FOR A VEHICLE SMART MIRROR

(71) Applicant: Solera Holdings, Inc., Westlake, TX (US)

(72) Inventors: Joseph Thomas Mader, Southlake, TX (US); Daniel Jun-Hyun Kim, Roanoke, TX (US); Anthony Aquila, Westlake, TX (US); Neal Jonathon Lowell, Roanoke, TX (US)

(73) Assignee: Solera Holdings, Inc., Westlake, TX (US)

( * ) Notice: Subject to any disclaimer, the term of this patent is extended or adjusted under 35 U.S.C. 154(b) by 0 days.

(21) Appl. No.: 15/927,837

(22) Filed: Mar. 21, 2018

(65) Prior Publication Data
US 2018/0276916 A1 Sep. 27, 2018

Related U.S. Application Data

(60) Provisional application No. 62/474,994, filed on Mar. 22, 2017, provisional application No. 62/475,008, (Continued)

(51) Int. Cl.
*G09G 3/00* (2006.01)
*B60R 1/04* (2006.01)
(Continued)

(52) U.S. Cl.
CPC .............. *G09G 3/001* (2013.01); *B60K 35/00* (2013.01); *B60R 1/04* (2013.01); *B60R 1/12* (2013.01);
(Continued)

(58) Field of Classification Search
USPC ....................................................... 701/32.7
See application file for complete search history.

(56) References Cited

U.S. PATENT DOCUMENTS 6,889,064 B2  5/2005 Baratono et al.
7,772,966 B2  8/2010 Turnbull et al.
(Continued)

OTHER PUBLICATIONS

U.S. Appl. No. 62/475,008, filed Mar. 22, 2017, Joseph Thomas Mader.
(Continued)

*Primary Examiner* — Lail A Kleinman
*Assistant Examiner* — Mahmoud M Kazimi
(74) *Attorney, Agent, or Firm* — Baker Botts L.L.P.

(57) ABSTRACT

In one embodiment, a vehicle mirror includes an on-board diagnostics (OBD) transceiver and one or more processors. The processors access OBD data received by the OBD transceiver from an OBD port of a vehicle. The processors further monitor the OBD data to determine whether communications with the OBD port have been lost, determine an OBD speed of the vehicle, and determine an RPM of an engine of the vehicle. The processors further determine a GPS speed of the vehicle from a GPS transceiver. When communications with the OBD port are lost, the processors transition the vehicle mirror to a sleep power state. When communications with the OBD port have not been lost, the processors transition the vehicle mirror to the sleep power state when the OBD speed is determined to be zero for at least a first predetermined amount of time and the RPM of the engine is determined to be less than a threshold RPM amount.

20 Claims, 13 Drawing Sheets

Related U.S. Application Data filed on Mar. 22, 2017, provisional application No. 62/475,002, filed on Mar. 22, 2017.

(51) Int. Cl.

| | | |
|---|---|---|
| *G07C 5/08* | (2006.01) | |
| *B60R 1/12* | (2006.01) | |
| *B60K 35/00* | (2006.01) | |
| *G07C 5/00* | (2006.01) | |
| *B60R 11/02* | (2006.01) | |
| *B60R 11/00* | (2006.01) | |
| *G02B 27/01* | (2006.01) | |

(52) U.S. Cl.
CPC ...... *G07C 5/0825* (2013.01); *B60K 2370/155* (2019.05); *B60K 2370/1529* (2019.05); *B60K 2370/186* (2019.05); *B60K 2370/334* (2019.05); *B60K 2370/52* (2019.05); *B60K 2370/736* (2019.05); *B60K 2370/777* (2019.05); *B60R 11/0217* (2013.01); *B60R 11/0247* (2013.01); *B60R 11/0258* (2013.01); *B60R 2001/123* (2013.01); *B60R 2001/1215* (2013.01); *B60R 2001/1223* (2013.01); *B60R 2001/1253* (2013.01); *B60R 2001/1276* (2013.01); *B60R 2001/1284* (2013.01); *B60R 2011/0033* (2013.01); *B60R 2011/0294* (2013.01); *B60R 2300/404* (2013.01); *B60R 2300/406* (2013.01); *G02B 27/0101* (2013.01); *G02B 2027/014* (2013.01); *G07C 5/008* (2013.01); *G09G 2340/045* (2013.01); *G09G 2340/0471* (2013.01); *G09G 2340/0478* (2013.01); *G09G 2354/00* (2013.01); *G09G 2380/10* (2013.01)

(56) References Cited

U.S. PATENT DOCUMENTS

| | | | |
|---|---|---|---|
| 8,494,447 B2 | 7/2013 | Oesterling et al. | |
| 8,543,289 B2 | 9/2013 | Owens et al. | |
| 2004/0267419 A1 | 12/2004 | Jeng | |
| 2011/0080481 A1 | 4/2011 | Bellingham | |
| 2012/0041640 A1* | 2/2012 | Videtich | B60R 1/12 701/34.4 |
| 2012/0083970 A1* | 4/2012 | Owens | B60K 35/00 701/33.4 |
| 2013/0179048 A1* | 7/2013 | Moffitt | B60T 13/665 701/70 |
| 2014/0293169 A1* | 10/2014 | Uken | B60R 1/12 349/12 |
| 2016/0019730 A1* | 1/2016 | Tripathi | G06Q 10/06 701/31.5 |
| 2017/0092019 A1* | 3/2017 | Liu | G07C 5/008 |
| 2018/0182182 A1* | 6/2018 | Meyer | B60W 40/09 |

OTHER PUBLICATIONS

U.S. Appl. No. 62/475,002, filed Mar. 22, 2017, Joseph Thomas Mader.
U.S. Appl. No. 15/927,793, filed Mar. 21, 2018, Joseph Thomas Mader.
U.S. Appl. No. 15/927,818, filed Mar. 21, 2018, Joseph Thomas Mader.

* cited by examiner

| Trip Start | Primary Detection | Secondary Detection | Tertiary Detection |
|---|---|---|---|
| Traditional Combustion–No Economy Mode | +/− 1VΔ + (RPM >100 OR OBD Speed >5MPH) | Wake on OBD Activity, then RPM >100 OR OBD Speed >5MPH (Continuous OBD polling not acceptable on non-electric vehicles) | GPS Speed >5MPH |
| Traditional Combustion–WITH Economy Mode | +/− 1VΔ + (RPM >100 OR OBD Speed >5MPH) | Wake on OBD Activity, then RPM >100 OR OBD Speed >5MPH (Continuous OBD polling not acceptable on non-electric vehicles) | GPS Speed >5MPH |
| Electric Vehicle | NA | Wake on OBD Activity, then OBD Speed >5MPH (Continuous OBD polling not acceptable on non-electric vehicles) | GPS Speed >5MPH |
| Traditional (NO OBDII Comm) | +/− 1VΔ +GPS Speed >5MPH | | |

| Trip End | Primary Detection | Secondary Detection | Tertiary Detection |
|---|---|---|---|
| Traditional Combustion–No Economy Mode | Established OBD Comm Lost | OBD Speed =0 for 10 Mins + RPM <100 or NULL | NA |
| Traditional Combustion–WITH Economy Mode | Established OBD Comm Lost | OBD Speed =0 for 10 Mins + RPM <100 or NULL | NA |
| Electric Vehicle | Established OBD Comm Lost | OBD Speed =0 for 10 Mins + RPM <100 or NULL | GPS Speed <5 MPH for >10 Mins (back-date end-time) |
| Traditional (NO OBDII Comm) | GPS Speed <5 MPH for >10 Mins + RPM = NULL (back-date end-time) | NA | NA |

FIG. 8

START AND STOP METHODS FOR A VEHICLE SMART MIRROR

TECHNICAL FIELD

This disclosure generally relates to vehicles and more specifically to start and stop methods for a vehicle smart mirror system.

BACKGROUND

Vehicles such as automobiles typically have multiple mirrors to assist the driver in safely operating the vehicle. For example, most cars include a main rearview mirror mounted to the windshield and two side mirrors mounted on both sides of the vehicle. However, typical mirrors, especially on older vehicles, do not have enhanced functionality.

SUMMARY OF PARTICULAR EMBODIMENTS

According to one embodiment, a vehicle mirror includes an on-board diagnostics (OBD) transceiver and one or more processors. The processors access OBD data received by the OBD transceiver from an OBD port of a vehicle. The processors further monitor the OBD data to determine whether communications with the OBD port have been lost, determine an OBD speed of the vehicle, and determine an RPM of an engine of the vehicle. The processors further determine a GPS speed of the vehicle from a GPS transceiver. When it is determined that communications with the OBD port have been lost, the processors transition the vehicle mirror from an awake power state to a sleep power state. When it is determined that communications with the OBD port have not been lost, the processors transition the vehicle mirror from the awake power state to the sleep power state when the OBD speed is determined to be zero for at least a first predetermined amount of time and the RPM of the engine is determined to be less than a threshold RPM amount. When it is determined that communications with the OBD port have not been lost, the processors transition the vehicle mirror from the awake power state to the sleep power state when the GPS speed is determined to be less than threshold GPS speed for at least a second predetermined amount of time and the RPM of the engine is determined to be less than the threshold RPM amount.

Technical advantages of certain embodiments may include providing a smart rearview mirror system that increases the safety, comfort, and driver satisfaction of their vehicle. In some embodiments, power management techniques may be implemented by the smart rearview mirror system in order to conserve power and prevent battery drainage. In some embodiments, a heads-up display (HUD) projector may be utilized within a smart rearview mirror system in order to project images and data onto the windshield of a vehicle, thereby increasing safety and convenience for the driver. Other technical advantages will be readily apparent to one skilled in the art from the following figures, descriptions, and claims. Moreover, while specific advantages have been enumerated above, various embodiments may include all, some, or none of the enumerated advantages.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 8 illustrates a chart of various power-management and trip start and stop logic that may be utilized by the smart rearview mirror of FIG. 1, according to certain embodiments.

DETAILED DESCRIPTION OF EXAMPLE EMBODIMENTS

Vehicles such as automobiles typically have multiple mirrors to assist the driver in safely operating the vehicle. For example, most cars include a main rearview mirror mounted to the windshield and two side mirrors mounted on both sides of the vehicle. However, typical mirrors, especially on older vehicles, do not have enhanced functionality.

To address the shortcomings of typical mirrors used in vehicles such as automobiles, embodiments of the disclosure provide a smart mirror system that may be installed or retrofitted on any appropriate vehicle. As one example, a smart rearview mirror may be installed to provide enhanced functionality to older cars that otherwise do not have such capabilities. The functionality may include, for example, global positioning system (GPS), Bluetooth, WiFi, and tire pressure monitoring functionality. In some embodiments, the smart rearview mirror may include a heads-up display (HUD) projector that displays information from the smart mirror onto a HUD reflector on the windshield. The HUD reflector may be applied to an existing windshield (e.g., stick-on film), or it may be integrated into the windshield. In some embodiments, the smart mirror may include logic that determines when the vehicle's engine starts/stops, when a trip starts/stops, and when to wake or sleep the smart mirror in order to conserve power. These and other features of a smart review mirror system are described in more detail below in reference to FIGS. 1-13.

Figure 1:
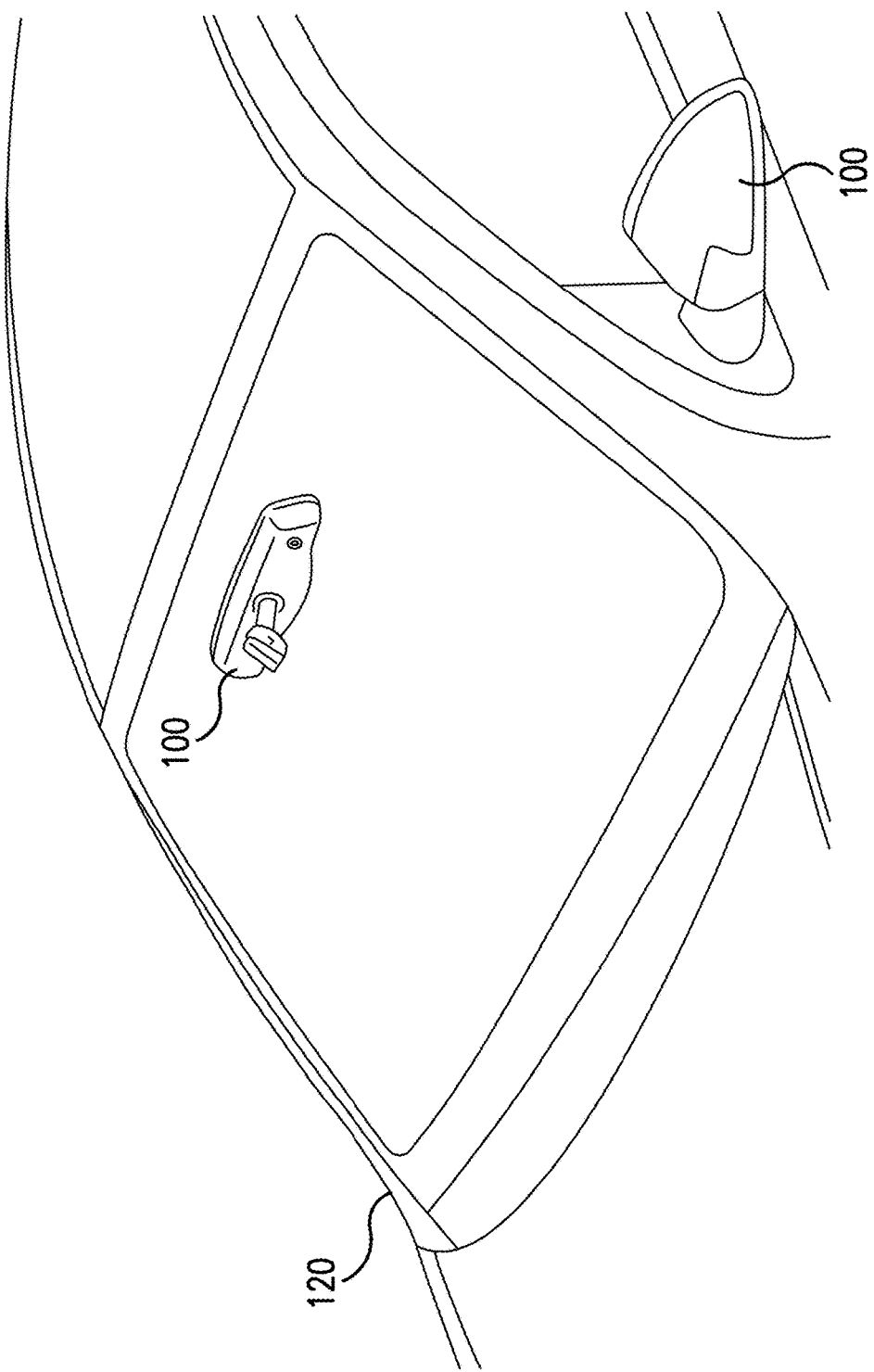
FIG. 1 illustrates an example vehicle that includes a smart rearview mirror, according to certain embodiments.

FIG. 1 illustrates an example vehicle 120 that includes a smart mirror 100, according to certain embodiments. Vehicle 120 is any appropriate means of transportation in which a driver may benefit from the use of a mirror (e.g., rearview mirror, side mirror, etc.). For example, vehicle 120 includes, but is not limited to, any ground-based vehicle such as an automobile, a motorcycle, an RV, an all-terrain vehicle (ATV), a golf cart, a tractor, a truck, construction equipment, and the like. Smart mirror 100 may be in any position on vehicle 120. For example, smart mirror 100 may be the main rearview mirror that is mounted on a windshield of vehicle 120, or in some embodiments, may be a side mirror that is positioned on either side of vehicle 120. In some embodiments, smart mirror 100 may be modular aftermarket vehicle computer (MAVC).

Figure 2:
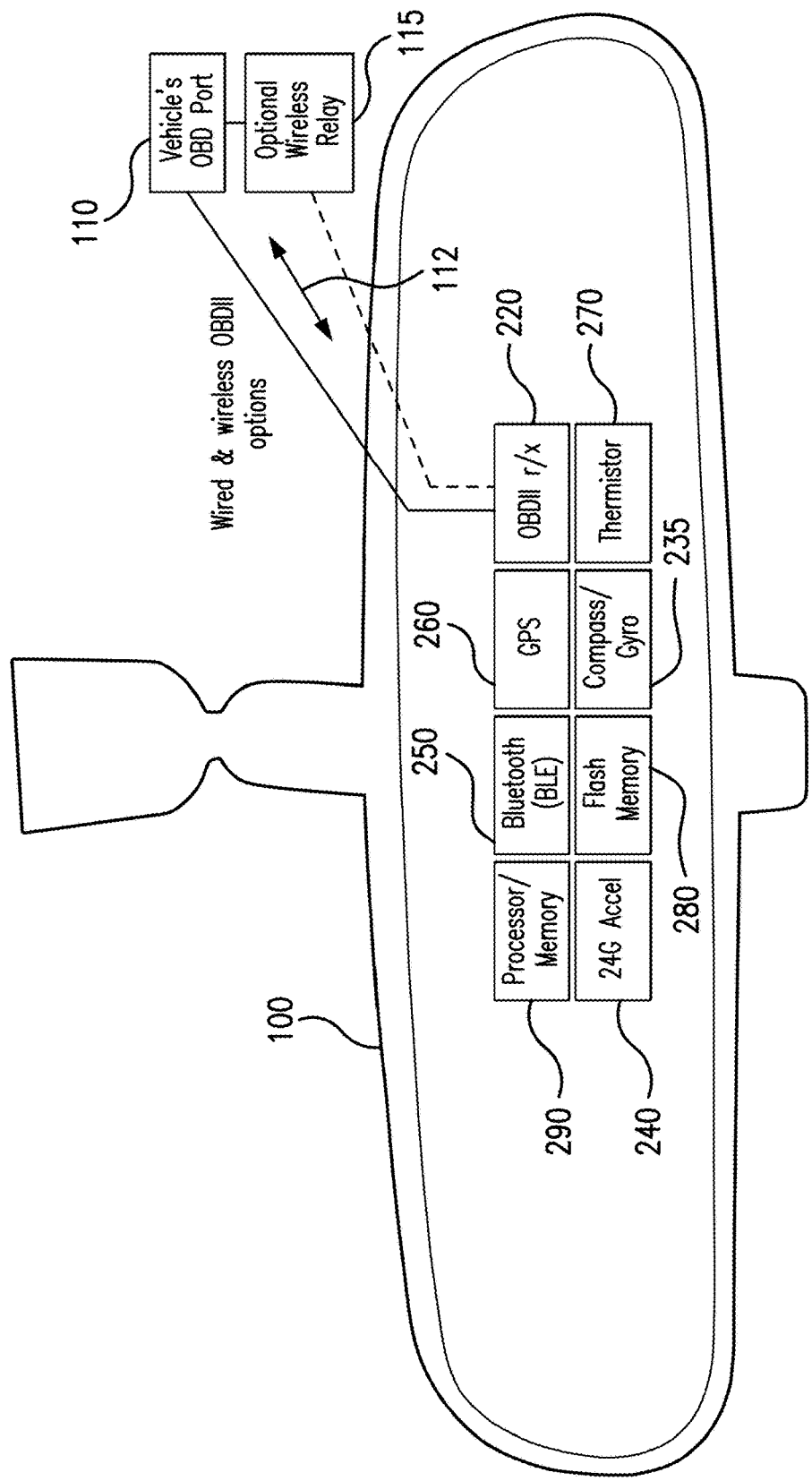
FIGS. 2-4 illustrate example embodiments of the smart rearview mirror of FIG. 1, according to certain embodiments.
Figure 3:
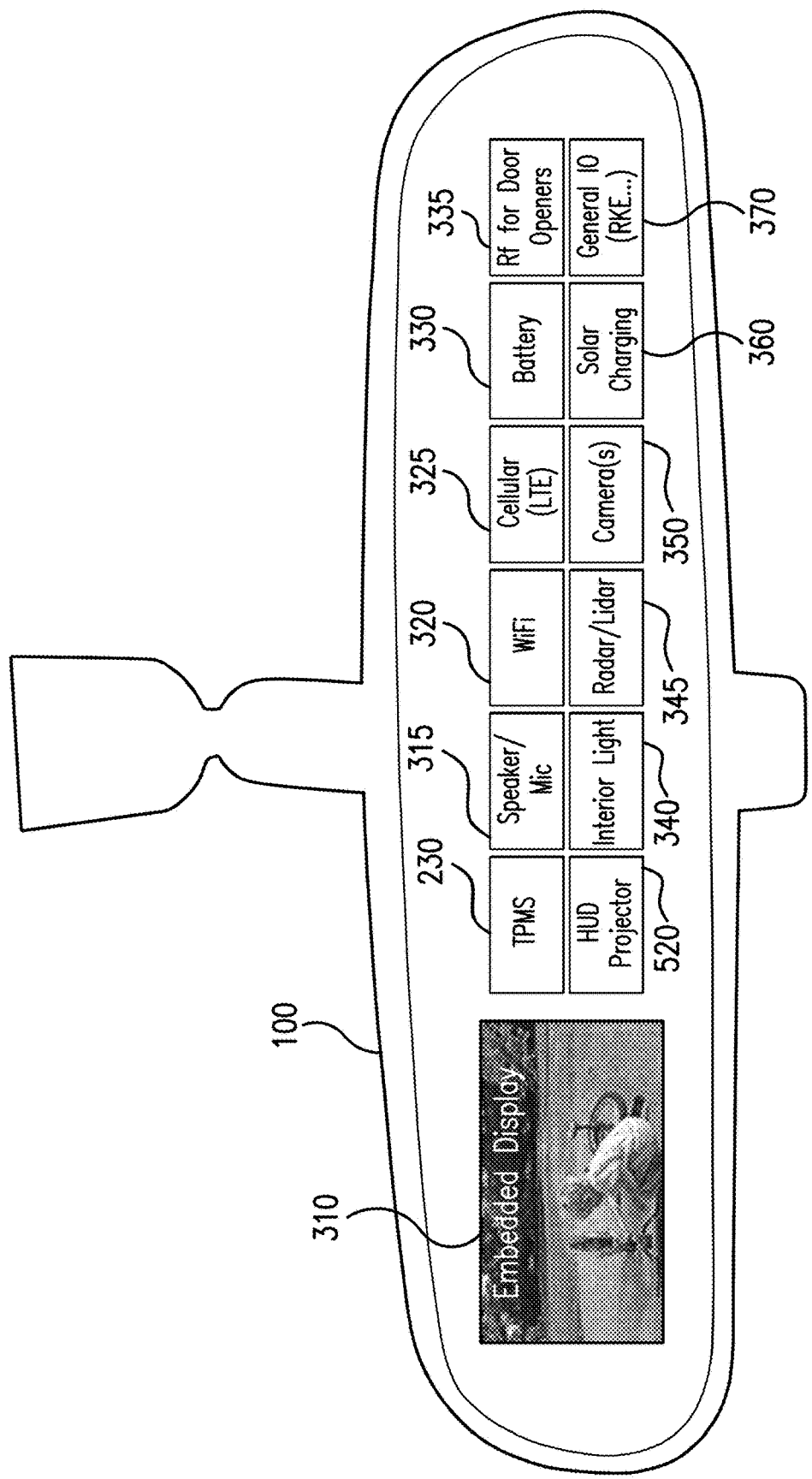
Figure 4:
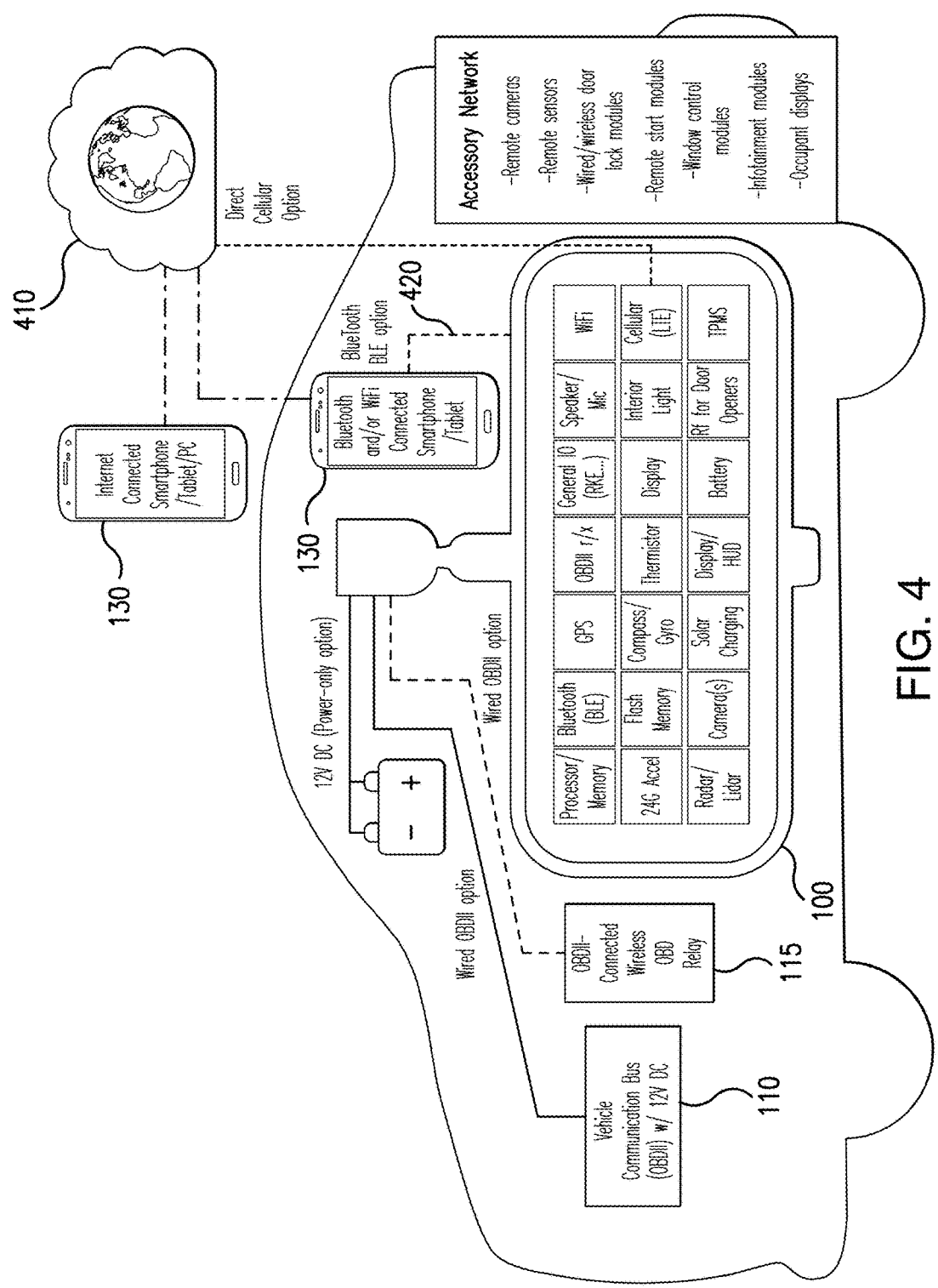

FIGS. 2-4 illustrate example embodiments of smart mirror 100. In some embodiments, as illustrated in FIG. 2, smart mirror 100 may include an OBD (on-board diagnostic) transceiver 220, a compass/gyro 235, one or more accelerometers 240, a Bluetooth transceiver 250, a GPS transceiver 260, a thermistor 270, memory 280, and a processor 290. Smart mirror 100 may communicate with an OBD port 110 either wirelessly or via a wired connection. In some embodiments, smart mirror 100 may communicate indirectly with OBD port 110 via an optional wireless relay 115. In some embodiments, wireless relay 115 may be any appropriate vehicle communications module (VCM).

OBD port 110 is any standard OBD port that is typically found in many vehicles. In general, OBD port provides OBD data 112 to smart mirror 100. In some embodiments, OBD port 110 provides self-diagnostic and vehicle reporting capabilities. In some embodiments, OBD port 110 provides access to the status of the various vehicle subsystems. In some embodiments, OBD port 110 is an OBD-II port. OBD port 110 communicates with smart mirror 100 using any standard protocol typically utilized by OBD ports.

In some embodiments, smart mirror 100 may provide (e.g., via a mobile app running on a client system 130 or via embedded display 310): trips and routes (e.g., mapped routes), speeds, hard braking/acceleration, collisions, battery health, etc. Such features may be provided by analyzing OBD data 112 from OBD port 110 or from one or more other components of smart mirror 100 (e.g., GPS transceiver 260, accelerometer 240, etc.). In embodiments that communicate with OBD port 110, smart mirror 100 may additionally provide: a vehicle identification number (VIN) of vehicle 120, odometer/miles, fuel level/fuel economy, engine temperatures, trouble codes, etc. These additional features may be provided by analyzing data from OBD port 110.

In some embodiments, as illustrated in FIG. 3, certain embodiments of smart mirror 100 may include additional components such as an embedded display 310, a TPMS receiver 230, a speaker/mic 315, a WiFi system 320, a cellular transceiver 325, a battery 330, an RF transmitter 335 (e.g., to open garage doors), a HUD projector 520, a light 340, a radar/lidar 345, one or more cameras 350, a solar charging system 360, and general I/O 370.

In some embodiments, as illustrated in FIG. 4, certain embodiments of smart mirror 100 may communicate via a communications link 420 with one or more client systems 130. Client system 130 may, in turn, communicate with a network 410 (e.g., the Internet or a cellular data network). This may enable smart mirror 100 to display data on client system 130 and to store data (e.g., routes, mileage, fuel economy, etc.) in network 410 that may be later accessed via another client system 130 or smart mirror 100. In some embodiments, smart mirror 100 may communicate directly with network 410 using cellular transceiver 325.

Communication link 420 may utilize any appropriate standard or proprietary communications protocol. In some embodiments, communications link 420 may utilize Bluetooth, BLE (Bluetooth low energy), and the like. In some embodiments, communications link 420 may utilize a proprietary protocol in conjunction with or in place of a standard protocol such as Bluetooth. Communications link 420 may also be utilized to communicate with accessory devices such as remote cameras, remote sensors, door lock modules, remote start modules, window control modules, infotainment modules, occupant displays, and the like.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable its user to communicate with smart mirror 100 and to view data from smart mirror 100.

In particular embodiments, client system 130 may include a mobile application (e.g., an "app") and/or a web browser (e.g., MICROSOFT INTERNET EXPLORER, GOOGLE CHROME, MOZILLA FIREFOX, etc.) for viewing information from smart mirror 100. For example, a mobile app on client device 130 may display routes, mileage, fuel economy, etc. from smart mirror 100.

While FIGS. 2-4 illustrate certain types and quantities of components of smart mirror 100, other embodiments of smart mirror 100 may include any other appropriate number or types of components for providing the functionality described herein. In addition, while smart mirror 100 is illustrated as including processor 290, other embodiments many include a microcontroller, a computer system such as computer system 1300 described below, or one or more microprocessors such as processor 1302 described below.

Figure 5:
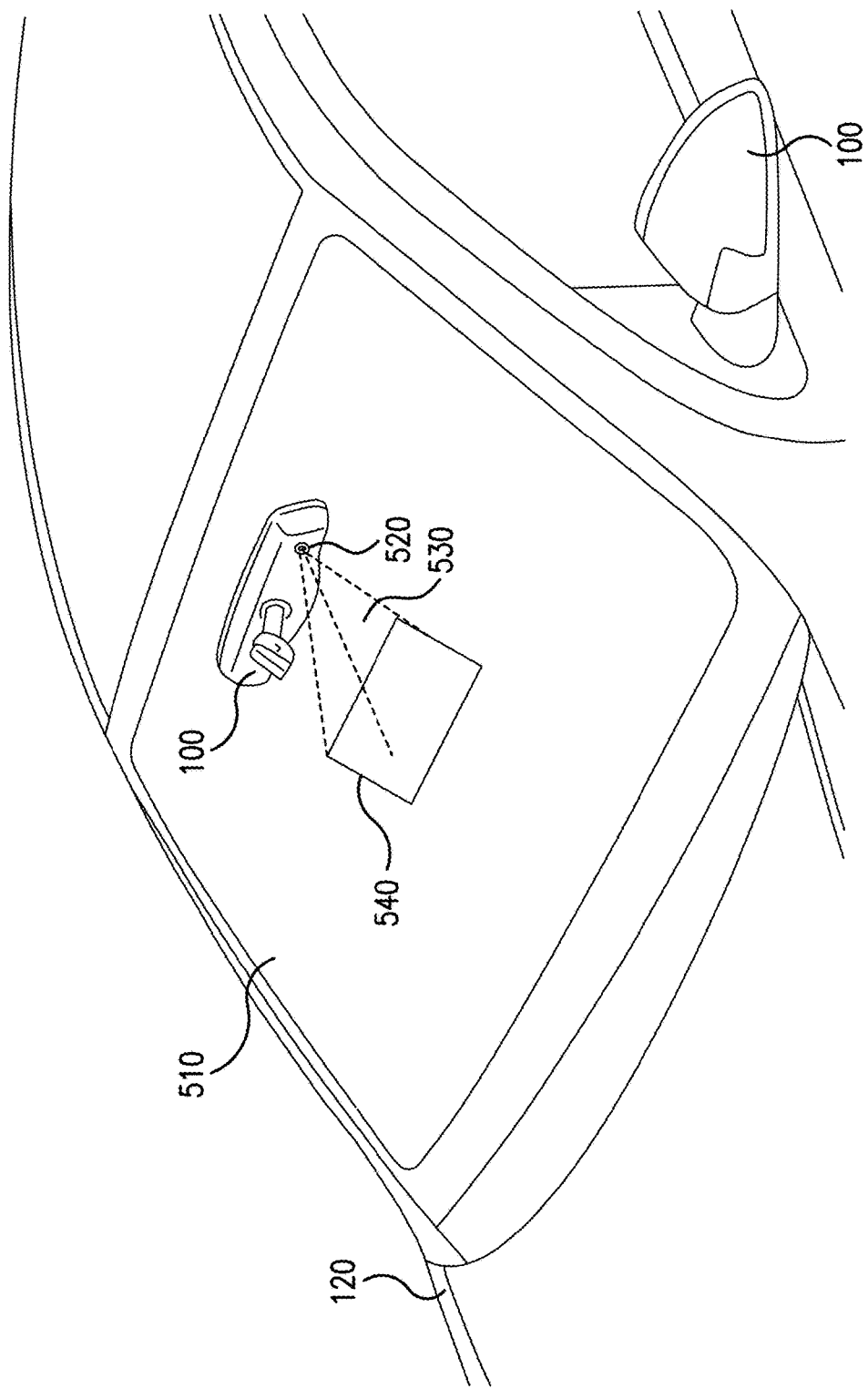
FIG. 5 illustrates an example smart rearview mirror that includes an integrated heads-up display projector, according to certain embodiments.

FIG. 5 illustrates an example smart mirror 100 that includes an integrated HUD projector 520 that may be used to project information from smart mirror 100 onto a windshield 510 of vehicle 120 or a HUD reflector 540 attached to or integrated within windshield 510. This may allow the driver of vehicle 120 to easily obtain information without having to take their eyes off of the road, thus increasing the safety of vehicle 120.

HUD reflector 540 is any appropriate material (e.g., plastic) that is able to reflect and display light that is projected from HUD projector 520. In some embodiments, HUD reflector 540 is integrated within windshield 510. That is, HUD reflector 540 may be manufactured within windshield 510. In other embodiments, HUD reflector 540 is an aftermarket add-on (e.g., a stick-on film). In some embodiments, HUD projector 520 may project images onto a mirror (e.g., on the dash of vehicle 120) that reflects the images onto HUD reflector 540 or windshield 510 of vehicle 120.

In some embodiments, smart mirror 100 automatically configures itself to accurately project images from HUD projector 520 onto an appropriate location on windshield 510. In some embodiments, smart mirror 100 automatically reconfigures HUD projector 520 after detecting movement of smart mirror 100 (e.g., from a manual user adjustment of smart mirror 100). Example embodiments of the automatic calibration of smart mirror 100 are discussed in more detail below in reference to FIG. 12.

Figure 6:
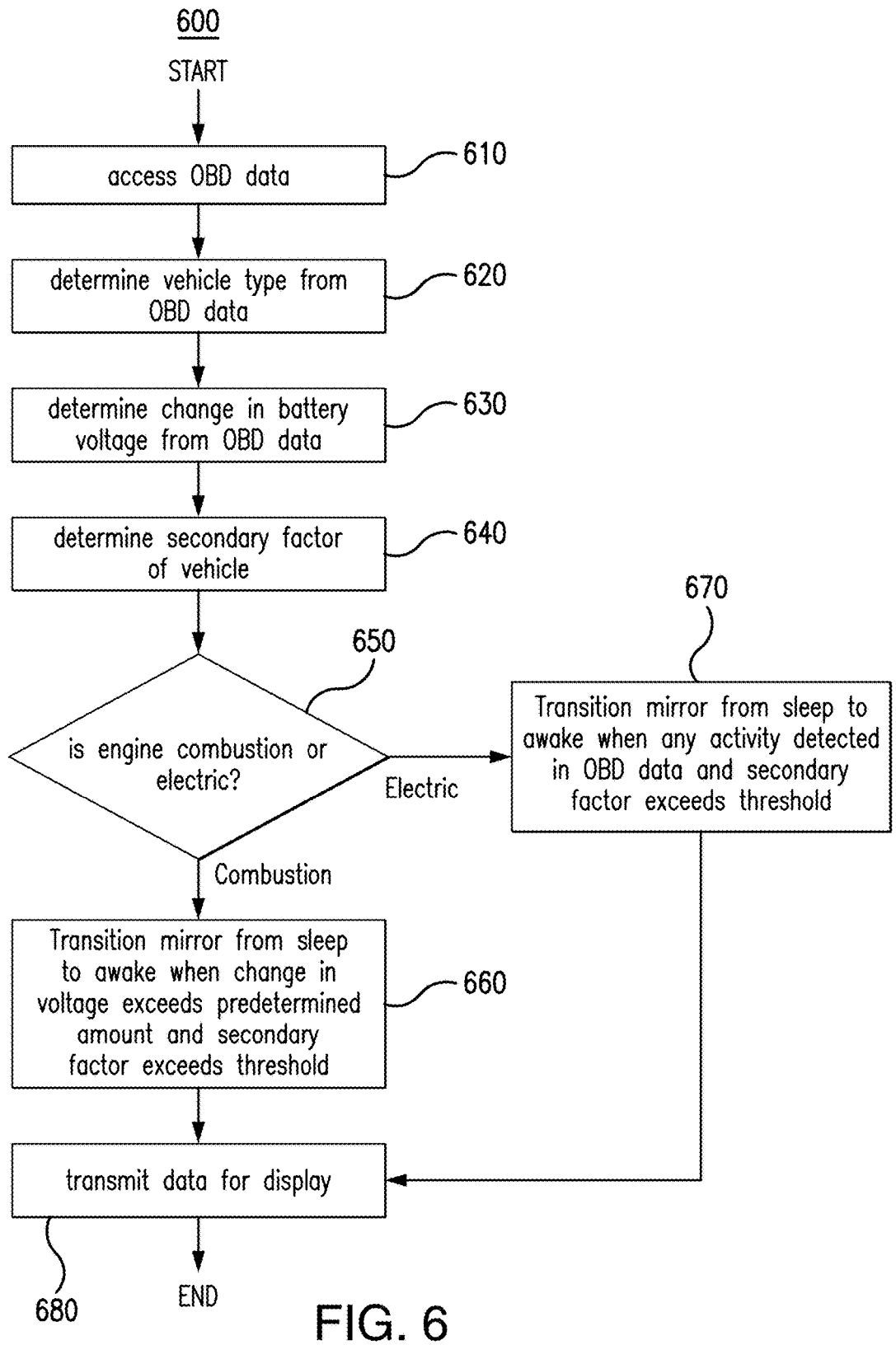
FIG. 6 illustrates a power-management method that may be utilized by the smart rearview mirror of FIG. 1, according to certain embodiments.

FIG. 6 illustrates a power-management method 600 that may be utilized by the smart review mirror of FIG. 1. In general, method 600 may be used by smart mirror 100 to determine when to wake smart mirror 100 (i.e., bring smart mirror 100 out of a low-power mode) and to determine trip starts/stops. Method 600 may begin in step 610 where OBD data that has been received by an OBD transceiver from an OBD port of a vehicle in which the vehicle mirror is installed is accessed. In some embodiments, the OBD data is OBD data 112 and the vehicle mirror is smart mirror 100.

At step 620, method 600 determines, from the OBD data of step 610, a vehicle type of the vehicle in which the vehicle mirror is installed. In some embodiments, the vehicle type comprises either a combustion engine vehicle or an electric vehicle. In some embodiments, this step may include accessing a VIN from OBD 112 and then searching a database using the VIN to determine whether the vehicle utilizes a combustion engine or an electric engine.

At step 630, method 600 determines a change in voltage of a battery of the vehicle using the OBD data of step 610. In some embodiments, this step may include determining a delta voltage over a certain period of time. For example, method 600 may determine how much the voltage has changed over a one-second time interval.

At step 640, method 600 determines, from the OBD data of step 610, a secondary factor of the vehicle. In some embodiments, the secondary factor may be an RPM of the engine of the vehicle as determined from the OBD data. In some embodiments, the secondary factor is a speed of the vehicle as determined from the OBD data.

At step 650, method 600 determines the vehicle type of step 620 is a combustion engine vehicle or an electric vehicle. If the vehicle type is a combustion engine vehicle, method 600 proceeds to step 660. If the vehicle type is an electric vehicle, method 600 proceeds to step 680.

At step 660, method 600 transitions the vehicle mirror from a sleep power state to an awake power state when the change in voltage of step 630 is greater than a predetermined amount and the secondary factor of the vehicle of step 640 is greater than a predetermined threshold. As a specific example, method 600 transitions the vehicle mirror from a sleep power state to an awake power state when the change in voltage of step 630 is greater than +/−1V and the RPM of the engine of the vehicle as determined from the OBD data is greater than 100. As another specific example, method 600 transitions the vehicle mirror from a sleep power state to an awake power state when the change in voltage of step 630 is greater than +/−1V and the speed of the vehicle as determined from the OBD data is greater than 5 MPH.

At step 670, method 600 transitions the vehicle mirror from a sleep power state to an awake power state when any activity is detected in the OBD data of step 610 and the secondary factor of the vehicle of step 640 is greater than a predetermined threshold. As a specific example, method 600 transitions the vehicle mirror from a sleep power state to an awake power state when any activity is detected in the OBD data and the RPM of the engine of the vehicle as determined from the OBD data is greater than 100. As another specific example, method 600 transitions the vehicle mirror from a sleep power state to an awake power state when any activity is detected in the OBD data and the speed of the vehicle as determined from the OBD data is greater than 5 MPH.

At step 680, method 600 transmits data associated with the OBD data for display in an embedded display of the vehicle mirror or on a client device. In some embodiments, the embedded display is embedded display 310. In some embodiments, the displayed data may be trip information, tire pressure information, GPS information, or any other information described herein. After step 680, method 600 may end.

Figure 7:
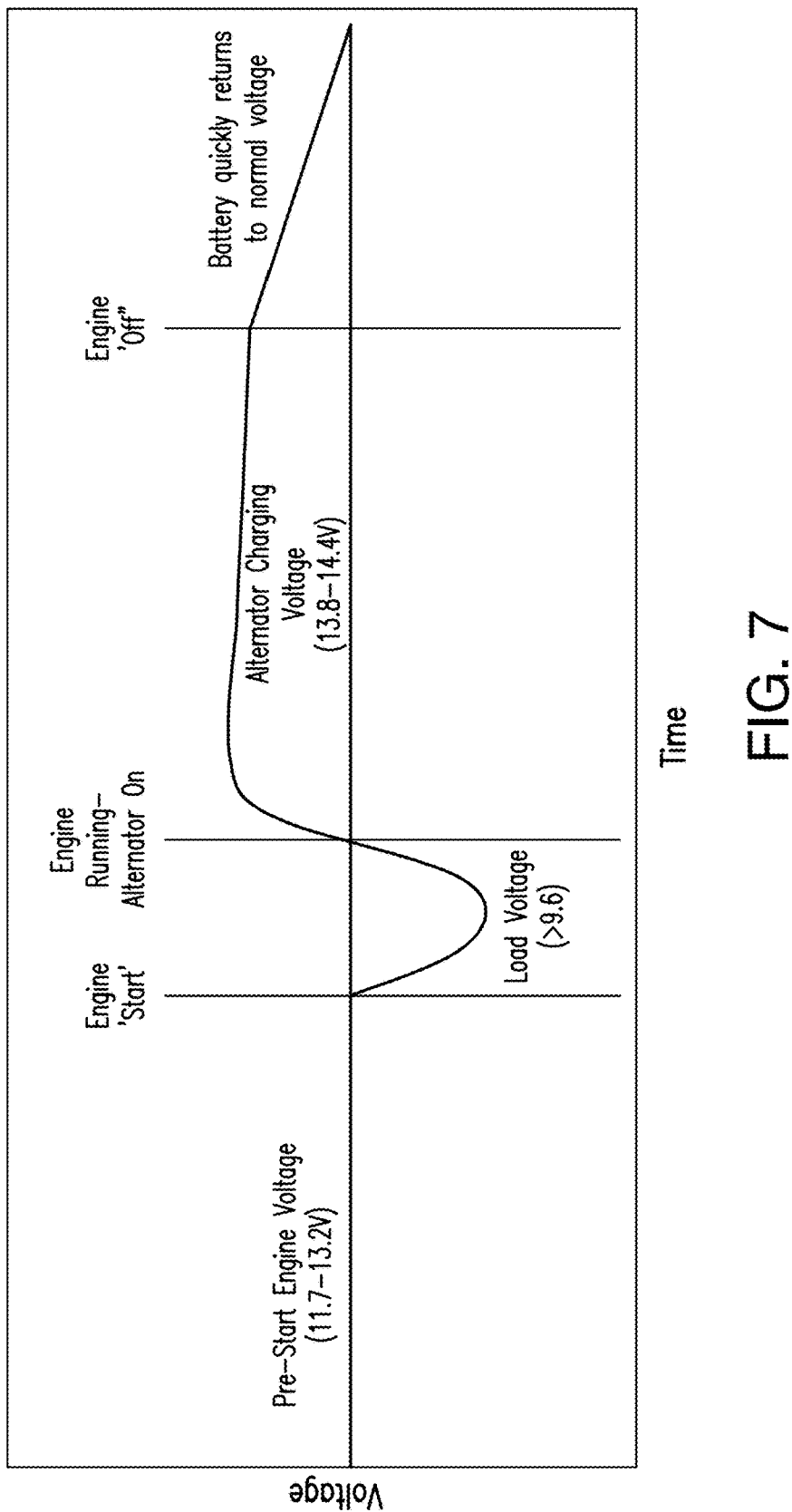
FIG. 7 illustrates a plot of a vehicle battery voltage, according to certain embodiments.

FIGS. 7-8 illustrate additional logic that may be utilized for power-management and determining trip starts/stops by smart mirror 100, according to certain embodiments. More specifically, these figures illustrate example logic and methods that may be used by smart mirror 100 to determine engine and trip starts/stops and to determine when to wake or put smart mirror 100 to sleep. While particular example values are illustrated in FIGS. 7-8 (e.g., voltage, speed, RPM, time, etc.), it should be understood that these values are merely examples for illustrative purposes only and other embodiments may utilize any other appropriate values. For example, other embodiments may utilize +/−0.1-0.9%, 1-9%, or 10-20% of the illustrated values.

As illustrated in FIG. 7, some embodiments of smart mirror 100 may 'wake' and 'sleep' based upon voltage changes upon the vehicle's electrical system and/or the presence of OBD communications. When a vehicle's engine is running, its alternator typically provides a fixed voltage of 13.8 to 14.4 V onto the vehicle's electrical system to charge the battery. When the engine is off, the electrical system's voltage rapidly returns to the battery's nominal voltage. When the engine is started, the electrical system's voltage very quickly dips below nominal voltage (as starter motor engages), and then immediately rises back above nominal voltage as the starter disengages and the alternator begins supplying power.

Whenever smart mirror 100 is powered (e.g., physically connected to a battery or diagnostic port), its OBD circuitry may continuously monitor the voltage provided by the vehicle electrical system through the OBD interface. By continuously or periodically monitoring the voltage provided by the vehicle electrical system through the OBD interface, smart mirror 100 may detect the large swing in voltage between the "engine start" point and the "engine running-alternator on" point as illustrated in FIG. 7. If the detected voltage differential or "swing" is greater than a predetermined amount (e.g., +/−1V DC), then smart mirror 100 may determine that the engine has been started. Based on this detection, smart mirror 100 may then transition smart mirror 100 from a low-power "sleep" mode to a normal, higher-power "awake" mode. By transitioning smart mirror 100 to "awake" mode in only certain situations, smart mirror 100 may reduce power consumption and prevent battery drainage of vehicle 120.

FIG. 8 illustrates logic 800 that may be used by smart mirror 100 to determine a trip start/stop or to wake smart mirror 100. In some embodiments, which logic 800 that is utilized by smart mirror 100 may depend on the type of vehicle 120 (e.g., electric, traditional combustion, etc.) as illustrated in the first column of FIG. 8. Logic 800 may utilize delta voltage, speed, OBD communication status, battery voltage, RPM, etc. to determine a trip start/stop as illustrated in FIG. 8.

Figure 9:
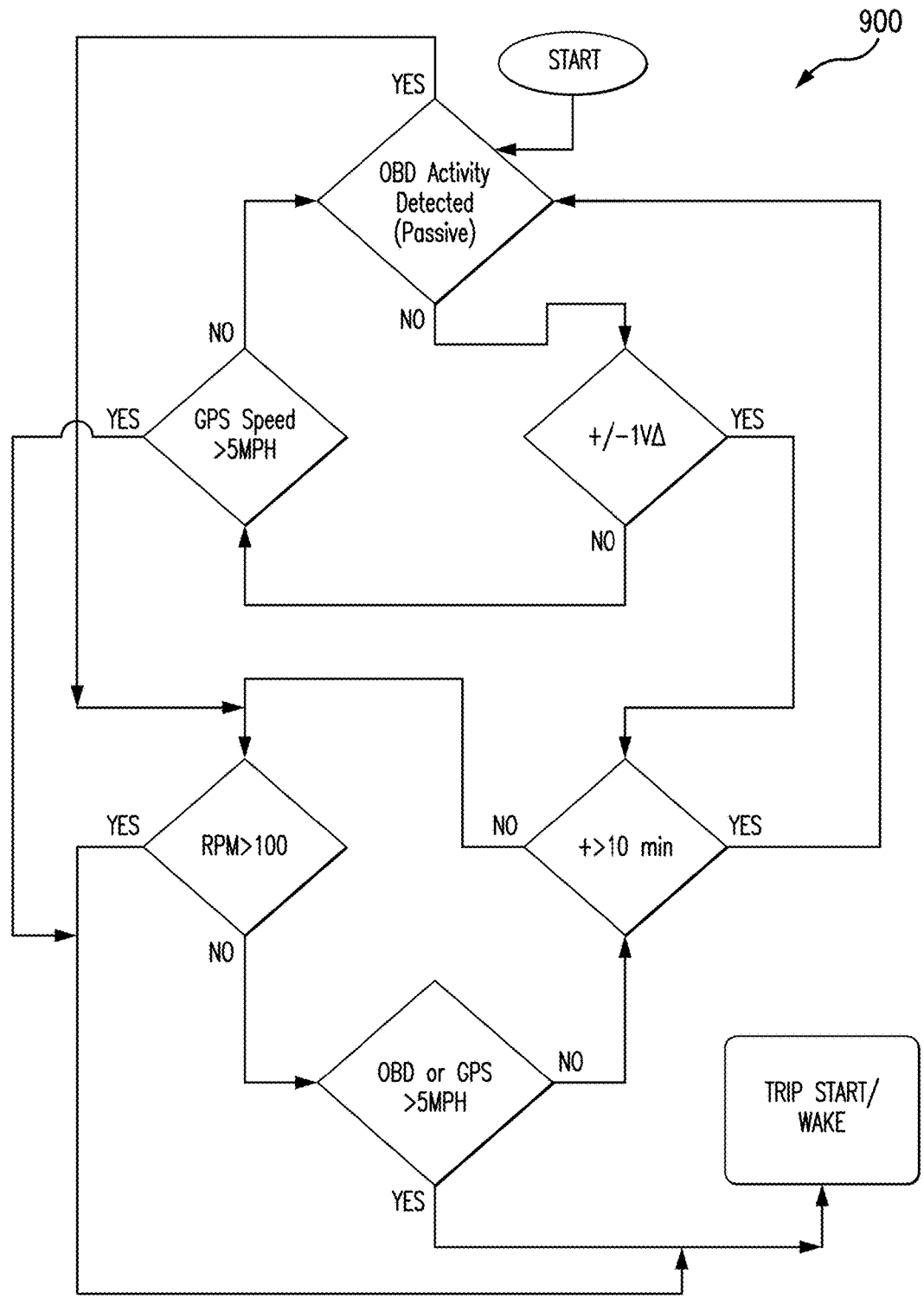
FIGS. 9-11 illustrate additional power-management methods that may be utilized by the smart mirror of FIG. 1, according to certain embodiments.

FIG. 9 illustrates a method 900 that may be used by smart mirror 100 to determine a trip start and to determine when smart mirror 100 should wake up (e.g., power up). In some embodiments, smart mirror 100 samples the vehicle's voltage periodically (e.g., every 0.25 seconds). If the measured voltage between any two samples differs by +/−1 V, then smart mirror 100 'wakes' and then may proceed with an arming process. Method 900 may include other determination steps as illustrated.

In some embodiments, smart mirror 100 indicates it is entering an arming process with an indication such as a blinking LED. In some embodiments, smart mirror 100 may arm once the engine RPM (e.g., "AT OC" OBD command) returns a value greater than a certain amount (e.g., 100), or it may return to sleep after a certain time period (e.g., ten minutes) without an acceptable RPM indication. In some embodiments, if vehicle voltage exceeds a high-voltage amount (e.g., 12.6V), then smart mirror 100 may remain in the pre-armed wake state indefinitely.

Figure 10:
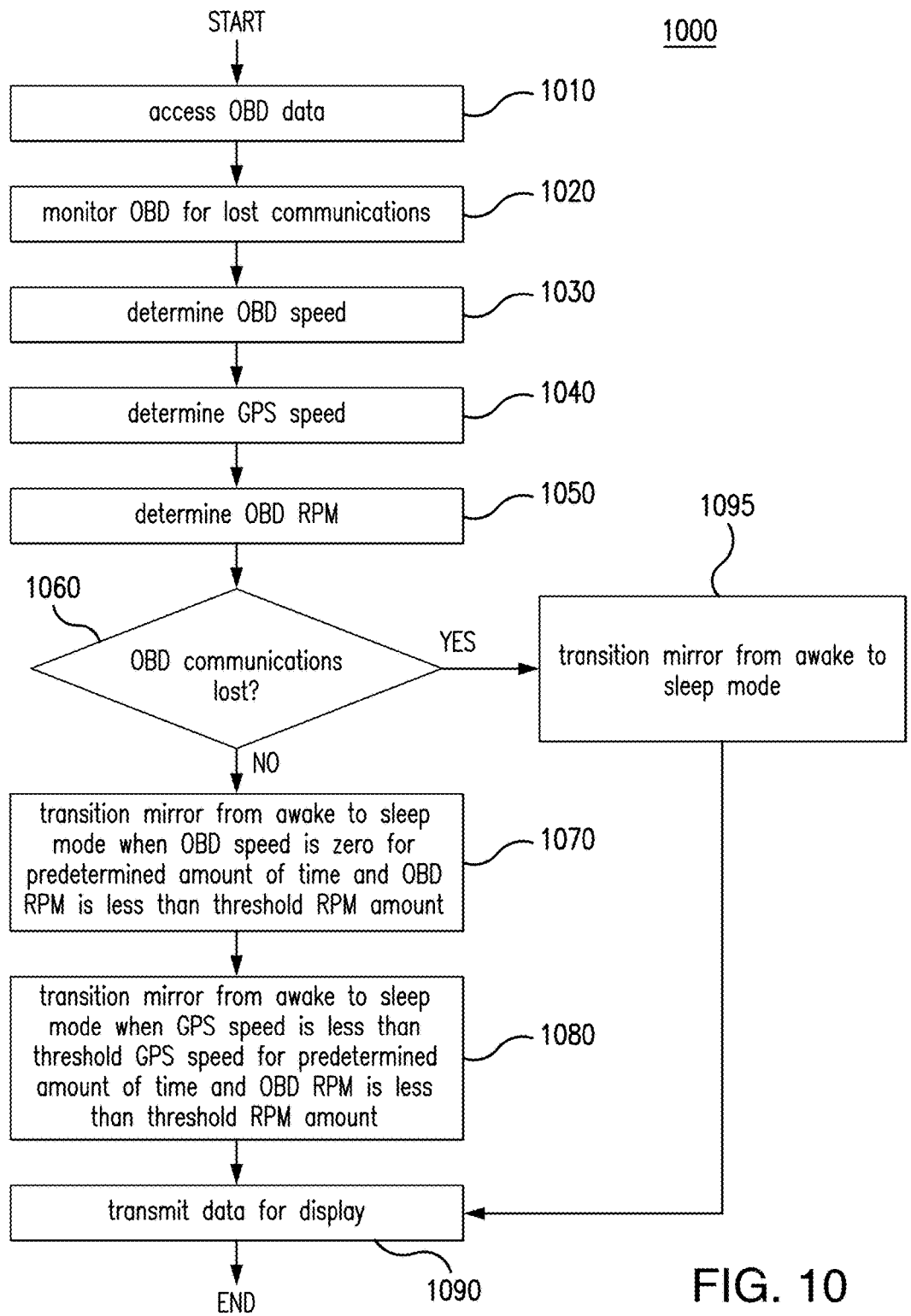

FIG. 10 illustrates an additional power-management method 1000 that may be utilized by smart mirror 100, according to certain embodiments. In general, method 1000 may be used to place smart mirror 100 in a lower-power "sleep" mode in order to conserve power and prevent battery drain. Method 1000 may begin in step 1010. In step 1010, method 1000 accesses OBD data that has been received by an OBD transceiver from an OBD port of a vehicle in which the vehicle mirror is installed is accessed. In some embodiments, the OBD data is OBD data 112 and the vehicle mirror is smart mirror 100.

At step 1020, method 1000 monitors the OBD data to determine whether communications with the OBD port have been lost. For example, method 1000 may repeatedly issue OBD commands and determine if any data is received in response. If no OBD data is received for a predetermined amount of time (e.g., thirty seconds), method 1000 may determine that communications with the OBD port have been lost.

At step 1030, method 1000 determines, from the OBD data of step 1010, a speed of the vehicle. For example, method 1000 may issue an appropriate OBD vehicle speed command and receive the vehicle's speed back in OBD data 112.

At step 1040, method 1000 determines, from a GPS transceiver of the vehicle mirror, a speed of the vehicle. At step 1050, method 1000 determines from the OBD data of step 1010, an engine RPM of the vehicle. For example, method 1000 may issue an appropriate OBD vehicle RPM command and receive the vehicle engine's RPM back in OBD data 112.

At step 1060, method 1000 takes different actions based on the determination of step 1020. If it is determined in step 1020 that communications with the OBD port have been lost, method 1000 proceeds to step 1095 where the mirror is transitioned from an awake mode to a lower-power sleep mode. If it is determined in step 1020 that communications with the OBD port have not been lost, method 1000 proceeds to step 1070.

At step 1070, method 1000 transitions the vehicle mirror from an awake power state to a sleep power state when the OBD speed of step 1030 is zero for a predetermined amount of time and the OBD RPM is less than a threshold RPM amount. As a specific example, method 1000 transitions the vehicle mirror from an awake power state to a sleep power state when the OBD speed of step 1030 is zero for at least ten minutes and the OBD RPM is less than 100.

At step 108, method 1000 transitions the vehicle mirror from an awake power state to a sleep power state when the GPS speed of step 1040 is less than a threshold GPS speed for a predetermined amount of time and the OBD RPM is less than a threshold RPM amount. As a specific example, method 1000 transitions the vehicle mirror from an awake power state to a sleep power state when the GPS speed of step 1040 is less than 5 MPH for at least ten minutes and the OBD RPM is less than 100.

At step 1090, method 1000 transmits data associated with the OBD data for display in an embedded display of the vehicle mirror or on a client device. In some embodiments, the embedded display is embedded display 310. In some embodiments, the displayed data may be trip information, tire pressure information, GPS information, or any other information described herein. After step 1090, method 1000 may end.

Figure 11:
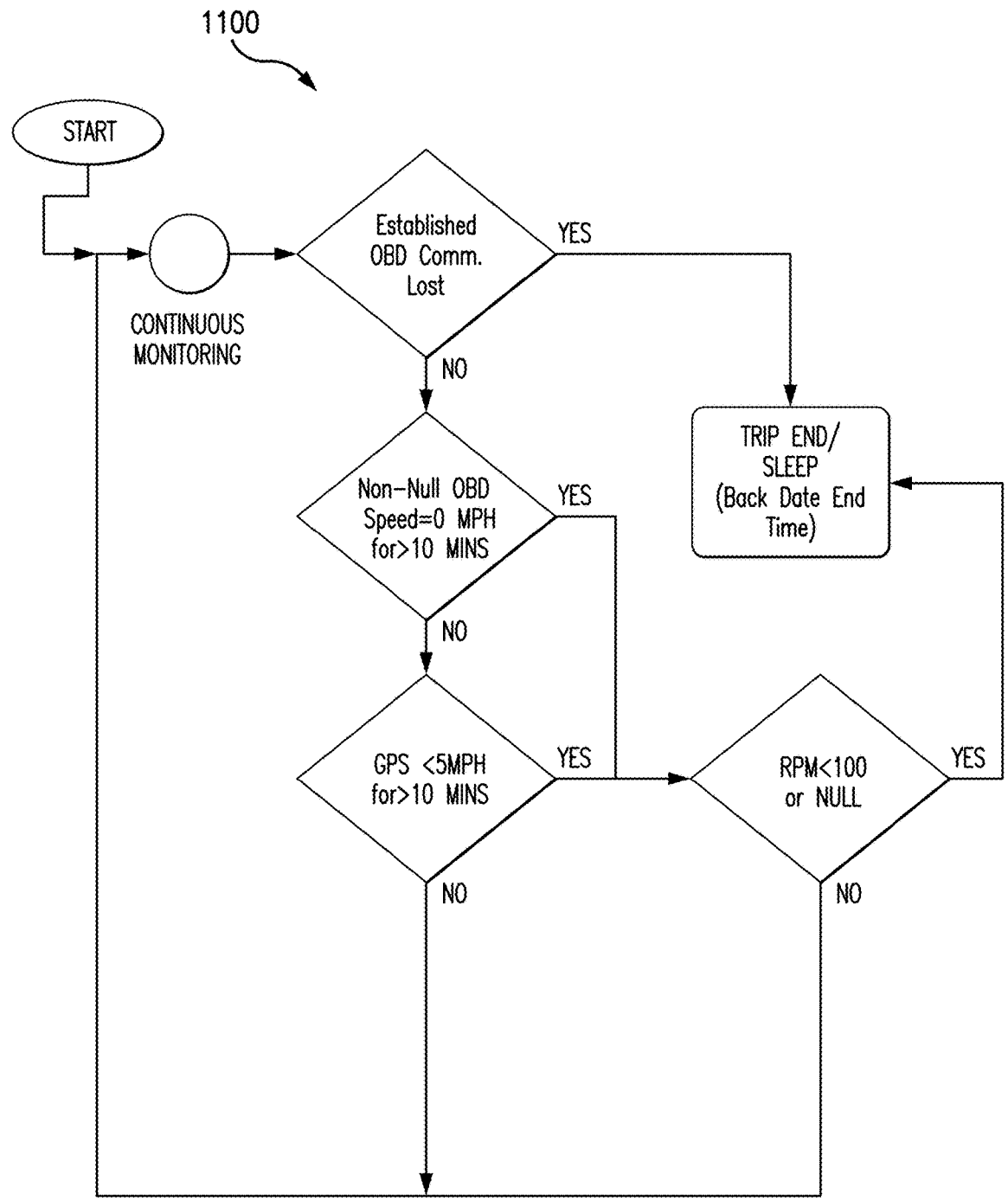

FIG. 11 illustrates a method 1100 that may be used by smart mirror 100 to determine a trip end and to determine when smart mirror 100 should sleep (e.g., power down). In some embodiments, smart mirror 100 will initiate its going to sleep process whenever the following apply: the vehicle stops responding to the vehicle speed OBD command (AT 0D) for a continuous duration of time (e.g., 60 seconds), OR measured vehicle voltage drops below a certain threshold (e.g., 12.6V) for a continuous period of time (e.g., ten seconds), OR the vehicle's engine reports (via OBD command AT 0C) an RPM of less than a certain amount (e.g., 100) for a continuous period of time (e.g., five minutes, sampled every thirty seconds). Method 1100 may include other determination steps as illustrated.

In some embodiments, if at any time the vehicle's voltage is less than a certain lower threshold (e.g., <9.0 v), then smart mirror 100 may completely shut down such that it draws zero (or near zero) current. In some embodiments, smart mirror 100 may require removal and re-installation before it will once again power-up.

Figure 12:
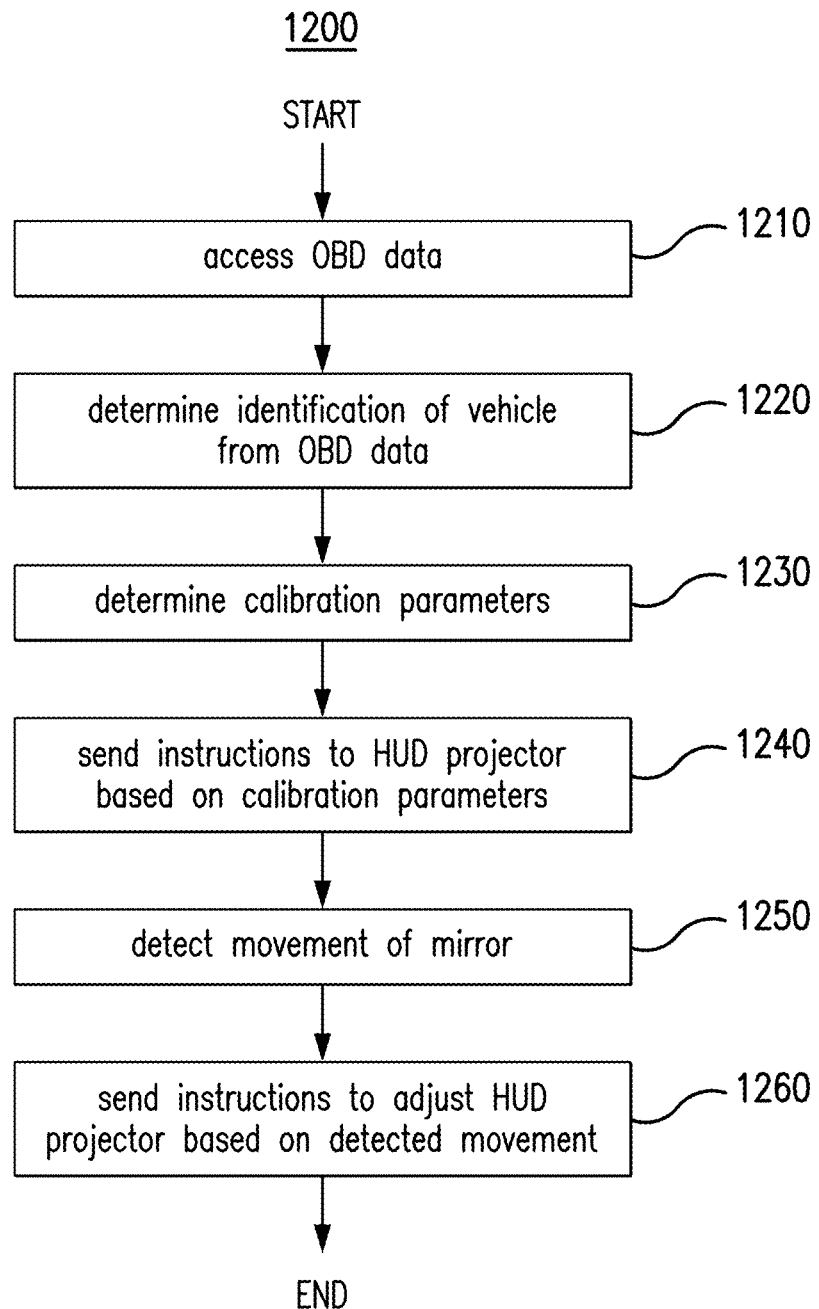
FIG. 12 illustrates a heads-up display (HUD) projector calibration method that may be utilized by the smart mirror of FIG. 1, according to certain embodiments.

FIG. 12 illustrates a HUD projector calibration method 1200 that may be utilized by smart mirror 100, according to certain embodiments. Method 1200 may be used to automatically configure smart mirror 100 after an initial installation or after power-up in order to accurately project images from HUD projector 520 onto an appropriate location on windshield 510 (e.g., onto HUD reflector 540). In some embodiments, method 1200 may be used to automatically reconfigure HUD projector 520 after detecting movement of smart mirror 100 (e.g., from a manual user adjustment of smart mirror 100).

In general, smart mirror 100 may automatically search for data to identify the identification (e.g., VIN) or type of vehicle 120 in which smart mirror 100 is installed. Example sources of the data may be OBD port 110 and network 410. Once the VIN or type of vehicle 120 has been determined, smart mirror 100 may then determine one or more calibration parameters for HUD projector 520 (e.g., an appropriate projector angle 530 in which to project light from HUD projector 520 in order to be in the proper position for the driver). Smart mirror 100 may additionally or alternatively determine a width of windshield 510, a driver position within vehicle 120, a height of the driver, etc., or it may consult specifications stored in smart mirror 100 or network 140 for the type of vehicle 120. Once appropriate projector calibration parameters for HUD projector 520 have been determined, instructions may be sent to HUD projector 520 to correctly configure HUD projector 520 according to the calibration parameters so that light may be correctly and accurately projected for the driver.

At step 1210, method 1200 accesses OBD data received by an OBD transceiver from an OBD port of a vehicle in which a vehicle mirror is installed. In some embodiments, the OBD data is OBD data 112 and the OBD port is OBD port 110. In some embodiments, the vehicle is vehicle 120 and the vehicle mirror is smart mirror 100.

At step 1220, method 1200 determines an identification of the vehicle from the OBD data accessed in step 1210. In some embodiments, the identification is a VIN of vehicle 120. In some embodiments, the identification is a year, make, and model of vehicle 120 that may be determined by cross-referencing a VIN of vehicle 120 with a database of known VINs.

At step 1230, method 1200 determines one or more calibration parameters for the HUD projector based on the determined identification of the vehicle. In some embodiments, the one or more calibration parameters are operable to position a displayed image from the HUD projector onto a HUD reflector within a line-of-sight of a driver of the vehicle. In some embodiments, the one or more calibration parameters include one or more of a projection angle, a vertical keystone setting, a horizontal keystone setting, a magnification setting, a zoom setting, a vertical position setting, a horizontal position setting, and an image size setting. In some embodiments, the one or more calibration parameters are determined by searching a database of known calibration parameters using the VIN of vehicle 120. As an example, the database may indicate that for a specific VIN, a particular projection angle, a particular zoom setting, and particular coordinates (e.g., left, right, up, down adjustments) should be used for the HUD projector in order to display an image from the HUD projector onto a HUD reflector within a line-of-sight of an average-sized driver of the vehicle.

At step 1240, method 1200 sends one or more instructions based on the one or more calibration parameters to the HUD projector. For example, if the one or more calibration parameters of step 1230 indicate a particular image zoom setting, method 1200 may send one or more instructions to set the HUD projector to the particular zoom setting.

At step 1250, method 1200 detects movement of the mirror. In some embodiments, movement of the mirror is detected by a motion-detection device such as a gyroscope or an accelerometer. The motion-detection device may be embedded within the mirror or otherwise coupled to the mirror. In some embodiments, the movement may be caused by a driver manually moving the mirror (e.g., to adjust the mirror to their liking). Or, the movement may be caused by jolts to the vehicle or accidental bumping of the mirror by a driver or passenger.

At step 1260, method 1200 sends one or more additional instructions to the HUD projector to adjust the displayed image based on the detected movement of step 1250. For example, if step 1250 detects movement of the mirror in a downward direction by a certain distance, method 1200 may instruct the HUD projector to shift the displayed image the same distance in an upward direction. After step 1260, method 1200 may end.

Proper calibration of the mirror's HUD projector beam is important to achieving a quality and legible display for the user. The distance and relative angle between the projection source and the target display on the front windshield greatly affect how the projected image will be displayed. As the distance between the projector and target surface increase, the displayed image will become larger. Also, as the relative angle between the projector output and plane of the target display area increases beyond 90 degrees, the overall shape of the displayed image will skew from a rectangle into a trapezoid. This results because the light from one or more sides of the projected image must travel a greater distance than the light on the opposing side before reaching the target display plane.

HUD projector 520 may utilize existing methods for correcting variations in projector-to-target display area orientation. For example, keystone correction may be used to manipulate the projected image vertically and/or horizontally to deliver a properly proportioned display for the user. Likewise, magnification or zoom of the image can be adjusted to increase the overall size of the displayed image to compensate for variations in distance between the display area and projector source.

Electronic control over horizontal and vertical keystone, as well as overall image magnification is especially important for a mirror-mounted HUD system used in vehicles. Each make, model, year, and type of vehicle will have a unique windshield to rearview mirror orientation and distance.

After initial installation, smart mirror 100 may automatically calibrate itself to its installed vehicle using known-good, pre-tested calibration parameters for the specific make, model, year, and type of vehicle 120. In some embodiments, smart mirror 100 uses its OBDII interface to query vehicle 120 for its VIN. A vehicle's VIN may be used to determine the exact make, model, year, and type of that specific vehicle. Once smart mirror 100 retrieves the vehicle's VIN, it may use the VIN to query a database for the HUD projector calibration parameters applicable to that specific vehicle. In some embodiments, smart mirror 100 communicates with the VIN/calibration database using an integrated wireless modem. In other embodiments it may use a Bluetooth or other locally connected device to connect to a remove or local VIN/calibration database. In some embodiments, smart mirror 100 may store its calibration data locally, so that it may routinely refresh the calibration settings.

After initial calibration, smart mirror 100 may be equipped to automatically adjust the direction and calibration of the projected image to automatically compensate for manual user adjustment of the position of the rearview mirror. This is particularly relevant for embodiments where the HUD projector is located within the pivotable mirror body, and not immovably mounted on the fixed mirror mounting bracket area.

For example, a shorter driver may need to angle the rearview mirror down towards them by a few degrees to enable better sightlines out the rear window. Without automatic compensation, this would cause the projected image to rise on the target display area, and could also adversely affect the keystone of the displayed image.

Some embodiments of smart mirror 100 incorporate gyroscope(s) and/or accelerometers to detect and quantify manual mirror adjustments. The integrated processor module uses these metrics to calculate any required corrections, and then commands the appropriate electronic projector control electronics to adjust the image accordingly.

Figure 13:
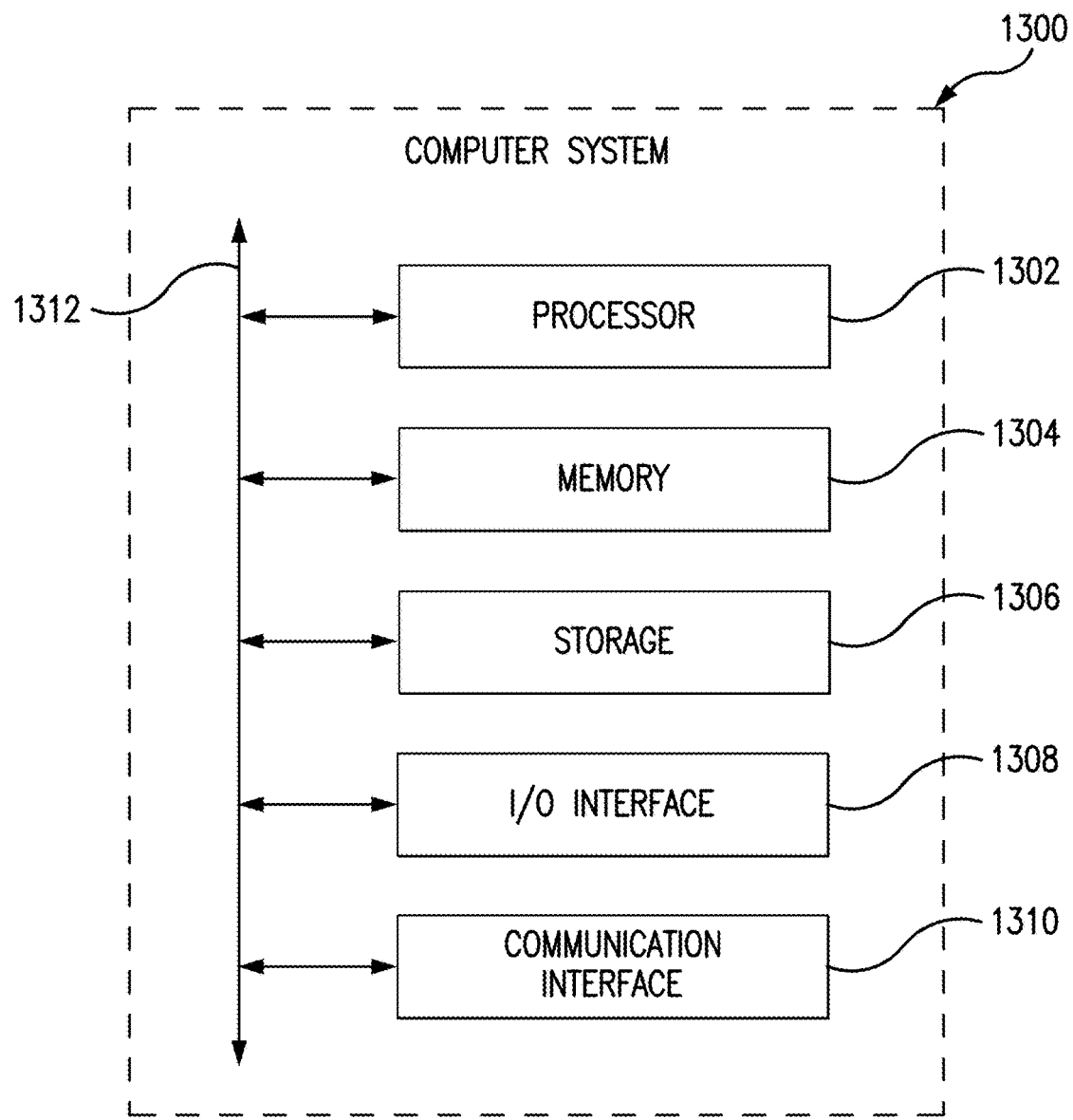
FIG. 13 illustrates an example computer system that may be used by certain embodiments.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1313, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM).

Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1313 includes hardware, software, or both providing one or more interfaces for communication (such as, for example, packet-based communication) between computer system 1300 and one or more other computer systems 1300 or one or more networks. As an example and not by way of limitation, communication interface 1313 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1313 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1313 for any of these networks, where appropriate. Communication interface 1313 may include one or more communication interfaces 1313, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A vehicle mirror comprising:
   one or more accelerometers;
   a Bluetooth transceiver;
   a GPS transceiver;
   an on-board diagnostics (OBD) transceiver;
   one or more processors; and
   a memory communicatively coupled to the one or more processors, the memory comprising instructions executable by the one or more processors, the one or more processors being operable when executing the instructions to:
     access OBD data received by the OBD transceiver from an OBD port of a vehicle in which the vehicle mirror is installed;
     monitor the OBD data to determine whether communications with the OBD port have been lost;
     determine, from the OBD data, an OBD speed of the vehicle;
     determine, from the GPS transceiver, a GPS speed of the vehicle;
     determine, from the OBD data, an RPM of an engine of the vehicle;
     when it is determined that communications with the OBD port have been lost, transition the vehicle mirror from an awake power state to a sleep power state;
     when it is determined that communications with the OBD port have not been lost:
       transition the vehicle mirror from the awake power state to the sleep power state when the OBD speed is determined to be zero for at least a first predetermined amount of time and the RPM of the engine is determined to be less than a threshold RPM amount; and
       transition the vehicle mirror from the awake power state to the sleep power state when the GPS speed is determined to be less than threshold GPS speed for at least a second predetermined amount of time and the RPM of the engine is determined to be less than the threshold RPM amount; and
     transmit data associated with the OBD data for display in an embedded display of the vehicle mirror or on a client device.

2. The vehicle mirror of claim 1, further comprising one or more of the following:
   a compass/gyro unit;
   a thermistor;
   a TPMS receiver;
   a speaker;
   a microphone;
   a WiFi communications unit;
   a radar unit;
   a lidar unit;
   a cellular communications unit;
   a battery;
   a camera;
   a solar charging system; and
   an RF communications unit.

3. The vehicle mirror of claim 1, wherein the vehicle comprises:
   an automobile;
   a motorcycle;
   a recreational vehicle (RV);
   an all terrain vehicle (ATV);
   a golf cart;
   a construction vehicle;
   a tractor; or
   a truck.

4. The vehicle mirror of claim 1, wherein the vehicle mirror communicates either wirelessly or via a wired connection to the OBD port of the vehicle.

5. The vehicle mirror of claim 1, wherein the sleep power state is a reduced-power state from the awake power state.

6. The vehicle mirror of claim 1, wherein the data associated with the OBD data is transmitted to the client device using the Bluetooth transceiver.

7. The vehicle mirror of claim 1, the one or more processors being further operable when executing the instructions to transition the vehicle mirror to a power shut down state if the determined voltage of the battery of the vehicle drops below a minimum voltage level.

8. A vehicle mirror comprising:
   an on-board diagnostics (OBD) transceiver;
   one or more processors; and
   a memory communicatively coupled to the one or more processors, the memory comprising instructions executable by the one or more processors, the one or more processors being operable when executing the instructions to:
     access OBD data received by the OBD transceiver from an OBD port of a vehicle in which the vehicle mirror is installed;
     monitor the OBD data to determine whether communications with the OBD port have been lost;
     determine, from the OBD data, an OBD speed of the vehicle;
     determine, from a GPS transceiver, a GPS speed of the vehicle;
     determine, from the OBD data, an RPM of an engine of the vehicle;
     when it is determined that communications with the OBD port have been lost, transition the vehicle mirror from an awake power state to a sleep power state;
     when it is determined that communications with the OBD port have not been lost:
       transition the vehicle mirror from the awake power state to the sleep power state when the OBD speed is determined to be zero for at least a first predetermined amount of time and the RPM of the engine is determined to be less than a threshold RPM amount; and
       transition the vehicle mirror from the awake power state to the sleep power state when the GPS speed is determined to be less than threshold GPS speed for at least a second predetermined amount of time and the RPM of the engine is determined to be less than the threshold RPM amount.

9. The vehicle mirror of claim 8, further comprising one or more of the following:
a compass/gyro unit;
a thermistor;
a TPMS receiver;
a speaker;
a microphone;
a WiFi communications unit;
a radar unit;
a lidar unit;
a cellular communications unit;
a battery;
a camera;
a solar charging system; and
an RF communications unit.

10. The vehicle mirror of claim 8, wherein the vehicle comprises:
an automobile;
a motorcycle;
a recreational vehicle (RV);
an all terrain vehicle (ATV);
a golf cart;
a construction vehicle;
a tractor; or
a truck.

11. The vehicle mirror of claim 8, wherein the vehicle mirror communicates either wirelessly or via a wired connection to the OBD port of the vehicle.

12. The vehicle mirror of claim 8, wherein the sleep power state is a reduced-power state from the awake power state.

13. The vehicle mirror of claim 8, wherein data associated with the OBD data is transmitted to a client device using a Bluetooth transceiver.

14. The vehicle mirror of claim 8, the one or more processors being further operable when executing the instructions to transition the vehicle mirror to a power shut down state if a determined voltage of the battery of the vehicle as determined from the OBD data drops below a minimum voltage level.

15. A vehicle mirror comprising:
an on-board diagnostics (OBD) transceiver;
one or more processors; and
a memory communicatively coupled to the one or more processors, the memory comprising instructions executable by the one or more processors, the one or more processors being operable when executing the instructions to:
access OBD data received by the OBD transceiver from an OBD port of a vehicle in which the vehicle mirror is installed;
monitor the OBD data to determine whether communications with the OBD port have been lost;
determine, from the OBD data, an OBD speed of the vehicle;
determine, from the OBD data, an RPM of an engine of the vehicle;
when it is determined that communications with the OBD port have been lost, transition the vehicle mirror from an awake power state to a sleep power state;
when it is determined that communications with the OBD port have not been lost, transition the vehicle mirror from the awake power state to the sleep power state when the OBD speed is determined to be zero for at least a first predetermined amount of time and the RPM of the engine is determined to be less than a threshold RPM amount.

16. The vehicle mirror of claim 15, further comprising one or more of the following:
a compass/gyro unit;
a thermistor;
a TPMS receiver;
a speaker;
a microphone;
a WiFi communications unit;
a radar unit;
a lidar unit;
a cellular communications unit;
a battery;
a camera;
a solar charging system; and
an RF communications unit.

17. The vehicle mirror of claim 15, wherein the vehicle mirror communicates either wirelessly or via a wired connection to the OBD port of the vehicle.

18. The vehicle mirror of claim 15, wherein the sleep power state is a reduced-power state from the awake power state.

19. The vehicle mirror of claim 15, wherein data associated with the OBD data is transmitted to a client device using a Bluetooth transceiver.

20. The vehicle mirror of claim 15, the one or more processors being further operable when executing the instructions to transition the vehicle mirror to a power shut down state if a determined voltage of the battery of the vehicle from the OBD data drops below a minimum voltage level.

* * * * *